US007455509B2

(12) United States Patent
Knoth et al.

(10) Patent No.: US 7,455,509 B2
(45) **Date of Patent: *Nov. 25, 2008**

(54) SYSTEM AND METHOD FOR LOADING A PLURALITY OF POWDER MATERIALS IN A COMPACTION PRESS

(75) Inventors: Edward Arlen Knoth, Beavercreek, OH (US); Bhanu Chelluri, Dublin, OH (US); Edward John Schumaker, Riverside, OH (US)

(73) Assignee: IAP Research, Inc., Dayton, OH (US)

( * ) Notice: Subject to any disclaimer, the term of this patent is extended or adjusted under 35 U.S.C. 154(b) by 519 days.

This patent is subject to a terminal disclaimer.

(21) Appl. No.: 11/044,594

(22) Filed: Jan. 27, 2005

(65) Prior Publication Data

US 2005/0201885 A1 Sep. 15, 2005

Related U.S. Application Data

(63) Continuation of application No. 09/952,647, filed on Sep. 14, 2001, now Pat. No. 6,868,778.

(51) Int. Cl.
*B29C 43/02* (2006.01)

(52) U.S. Cl. ......................... 425/78; 425/80.1; 425/353

(58) Field of Classification Search ..................... 425/3, 425/78, 80.1, 130, 133.1, 352–355, DIG. 33
See application file for complete search history.

(56) References Cited

U.S. PATENT DOCUMENTS 929,687 A 8/1909 Monnot
2,552,090 A * 5/1951 Eusner ....................... 425/130
2,966,704 A 1/1961 O'Brian et al.
2,976,907 A 3/1961 Harvey et al.
3,346,914 A 10/1967 Sandstrom et al.
3,347,074 A 10/1967 Eilers et al.
3,414,940 A 12/1968 Vinson
3,640,654 A 2/1972 Smith
3,838,488 A 10/1974 Tada et al.

(Continued)

FOREIGN PATENT DOCUMENTS

DE 975 730 C 7/1962

(Continued)

OTHER PUBLICATIONS

U.S. Statutory Invention Registration No. H120, issued to Corwin, published on Sep. 2, 1986, for Method of Electroforming a Ceramic Faced Workpiece.

(Continued)

*Primary Examiner*—Yogendra Gupta
*Assistant Examiner*—Thu Khanh T Nguyen
(74) *Attorney, Agent, or Firm*—Jacox, Meckstroth & Jenkins

(57) ABSTRACT

This invention relates to a system and method for loading a plurality of powder materials into a magnetic compaction tool. The system and method employ a powder loader which guides the plurality of powder materials into predetermined locations in the magnetic compaction tool so that when the tool is electromagnetically energized, the plurality of powder materials are compacted to form a part having a plurality of densified metals formed by the plurality of powder materials.

21 Claims, 6 Drawing Sheets

U.S. PATENT DOCUMENTS

| | | | | |
|---|---|---|---|---|
| 3,892,506 | A | 7/1975 | Dann et al. | |
| 4,130,926 | A | 12/1978 | Willem | |
| 4,147,489 | A | 4/1979 | Milburn et al. | |
| 4,170,887 | A | 10/1979 | Baranov | |
| 4,260,346 | A | 4/1981 | Anderson, Jr. et al. | |
| 4,261,092 | A | 4/1981 | Corwin | |
| 4,297,388 | A | 10/1981 | Kumar et al. | |
| 4,298,563 | A | 11/1981 | DeSantis et al. | |
| 4,352,648 | A | 10/1982 | Hilton | |
| 4,380,473 | A | 4/1983 | Lichtinghagen | |
| 4,592,889 | A | 6/1986 | Leupold et al. | |
| 4,696,100 | A | 9/1987 | Yamamoto et al. | |
| 4,717,627 | A | 1/1988 | Nellis et al. | |
| 4,762,754 | A | 8/1988 | Nellis et al. | |
| 4,853,180 | A | 8/1989 | Howard | |
| 4,929,415 | A | 5/1990 | Okazaki | |
| 4,939,121 | A | 7/1990 | Rybka | |
| 4,962,656 | A | 10/1990 | Kunerth et al. | |
| 5,004,722 | A | 4/1991 | Tallman | |
| 5,030,614 | A | 7/1991 | Hollander et al. | |
| 5,057,486 | A | 10/1991 | Arendt et al. | |
| 5,079,225 | A | 1/1992 | Holloway | |
| 5,084,088 | A | 1/1992 | Okazaki | |
| 5,096,880 | A | 3/1992 | Rybka | |
| 5,101,560 | A | 4/1992 | Leonard et al. | |
| 5,162,296 | A | 11/1992 | Yamazaki | |
| 5,169,572 | A | 12/1992 | Matthews | |
| 5,214,840 | A | 6/1993 | Imagawa et al. | |
| 5,236,021 | A | 8/1993 | Bewlay et al. | |
| 5,250,255 | A | 10/1993 | Sagawa et al. | |
| 5,262,396 | A | 11/1993 | Yamazaki | |
| 5,364,253 | A * | 11/1994 | Kojima et al. | 425/78 |
| 5,405,574 | A | 4/1995 | Chelluri et al. | |
| 5,427,514 | A | 6/1995 | Horibe et al. | |
| 5,503,686 | A | 4/1996 | Okamura et al. | |
| 5,611,139 | A | 3/1997 | Chelluri et al. | |
| 5,611,230 | A | 3/1997 | Chelluri et al. | |
| 5,689,797 | A | 11/1997 | Chelluri et al. | |
| 5,747,073 | A * | 5/1998 | Pettersson et al. | 425/78 |
| 6,136,265 | A | 10/2000 | Gay | |
| 6,156,264 | A | 12/2000 | Johnston et al. | |
| 6,188,304 | B1 | 2/2001 | Skinner et al. | |
| 6,241,935 | B1 | 6/2001 | Beane et al. | |
| 6,273,963 | B1 | 8/2001 | Barber | |
| 6,321,800 | B1 * | 11/2001 | Ogawa et al. | 141/71 |

FOREIGN PATENT DOCUMENTS

| | | |
|---|---|---|
| WO | WO 98 06525 | 2/1998 |

OTHER PUBLICATIONS

"Kinetics of Magnetic Pulse Pressing of Iron Powder," Soviet Powder Metallurgy and Metal Ceramics, vol. 13, No. 9, 1975, pp. 709-711 XP0021444651.

"Melt-Textured Growth of Polycrystaline." Physical Review B, vol. 37, No. 13, May 1, 1988.

"High-Field Critical Current Densities," 1989 Applied Physics Letters, p. 2441.

"Hot Extrusion of High-Temperature Superconducting Oxides," American Ceramics Bulletin, p. 813, May 1991.

"Crystallagraphicall Oriented Superconducting bi2Sr2CaCu2O8 by Shock Compaction of Prealigned Powder," Applied Physics Letters 57, p. 93, Jul. 2, 1990.

"Metal Matrix High-Temperature Superconductor," Metal Progress, Advanced Materials and Processes, Inc., p. 37, Oct. 1987.

"Densification of Yba2CO7 8 by Uniaxial Pressure Sintering," Cryogenics, vol. 30, May 1990.

"Electromagnetic Forming," Pulsed Power Lecture Series, Lecture No. 36 by J. Bennett and M. Plum, 1980.

German publication entitled, Planseeberichte Fur Pulvermetallurgie, Pulverdichten mit Magnetimpulsen, pp. 175-190, 1976 (translation included).

"Dynamic Magnetic Compaction (DMC) of W-Steel Composite Powders," Specialty Materials and Composites Advances in Particulate Materials, Metal Powder Industries Federation: Princeton, N.J., vol. 5, pp. 219-226, 1994.

"Composite Solid Armature Consolidation by Pulse Power Processing: A Novel Homopolar Generator Application in EML Technology," Transactions on Magnetics, vol. 25, No. 1, pp. 429-432, Jan. 1989.

"High Energy, High-Rate Materials Processing," Journal of Metals, pp. 6-10, Dec. 1987.

"Explosive Compaction of Metal Powders", C.R.A. Lennon, A.K. Bhalla and J.D. Williams, Powder Metallurgy, 1978, No. 1.

* cited by examiner

SYSTEM AND METHOD FOR LOADING A PLURALITY OF POWDER MATERIALS IN A COMPACTION PRESS

CROSS-REFERENCE TO RELATED APPLICATION

This application is a continuation of U.S. patent application Ser. No. 09/952,647 filed Sep. 14, 2001 now U.S. Pat. No. 6,868,778.

FIELD OF THE INVENTION

This invention relates to the compacting of powder materials and more particularly to a system and method for loading a plurality of powder materials into a tool or die of an electromagnetic compaction process.

BACKGROUND OF THE INVENTION

Several methods have been employed for forming particulate or powder-like materials in a unitary, firmly compacted body of material. Powder metal bodies have been formed by means of pressure and heat. U.S. Pat. Nos. 5,405,574; 5,611,139; 5,611,230; 6,156,264 and 6,188,304 all suggest systems and/or methods for compacting powder-like materials using electromagnetic compaction techniques.

The die and powder material would be placed in an electromagnetic compaction system and energized to form a densified powder part. FIGS. 3-10 of U.S. Pat. No. 5,611,139, which is assigned to the same assignee as the present invention, illustrate various techniques for compacting a powder to form a part.

Unfortunately, it was difficult to arrange or situate a plurality of powder materials into a compaction tool or die in operative relationship with the armature. It was difficult to load or arrange a plurality of powder materials in the compaction tool or die so that they remain separate and distinct and do not mix.

What is needed, therefore, is a system and method for arranging and locating a plurality of powder or particulate materials in a magnetic compaction machine in order to provide a part having a plurality of densified materials.

SUMMARY OF THE INVENTION

It is a primary object of the invention to provide a system and method for loading a plurality of powder materials in a predetermined arrangement or order into an electromagnetic compaction system which will electromagnetically compact the materials to form a densified part comprising a plurality of densified, but distinct, materials.

In one aspect, this invention comprises a system for loading a plurality of powder materials into a magnetic compaction tool comprising a powder loader comprising a plurality of channels for channeling each of said plurality of powder materials into predetermined locations in the magnetic compaction tool so that when said tool is electro-magnetically energized, said plurality of powder materials are compacted to form a part.

In another aspect, this invention comprises a compaction system comprising a compactor for compacting a plurality of powder materials to form a part; a die for receiving said plurality of powder materials; and a powder loader comprising a plurality of channels for channeling each of said plurality of powder materials into a predetermined configuration in said die; said die being situated in said compactor so that said plurality of powder materials become compacted to produce said part comprising a plurality of powder materials to form said part having a plurality of densified powder materials.

In still another aspect of the invention, this invention comprises a method for compacting a plurality of powder materials to provide a part, said method comprising the steps of situating a powder loader in operative relationship with a die; using said powder loader to load said plurality of powder materials in said powder loader into said die; and compacting said plurality of powder materials to form the part having a plurality of distinct densified powders.

Another object of the invention is to provide a system and method for utilizing a powder loader that melts during the compaction process to facilitate securing and retaining the powder materials in a desired configuration.

Another object of the invention is to provide a system and method which will reduce the time required for loading a plurality of materials into a die for forming a part.

Still another object of this invention is to provide a system and method for forming a predetermined characteristic in a finished part.

Another object of the invention is to provide a system and method for forming a plurality of apertures or voids in a part.

Still another object of the invention is to provide a system and method for making a permanent magnet stator for use in an electric motor.

Yet another object of the invention is to provide a system and method for guiding or channeling a plurality of powder materials into a predetermined position in an electromagnetic compaction tool.

Other objects and advantages of the invention will be apparent from the following description, the accompanying drawings and the appended claims.

BRIEF DESCRIPTION OF THE ACCOMPANYING DRAWINGS

DETAILED DESCRIPTION OF PREFERRED EMBODIMENT

Figure 1:
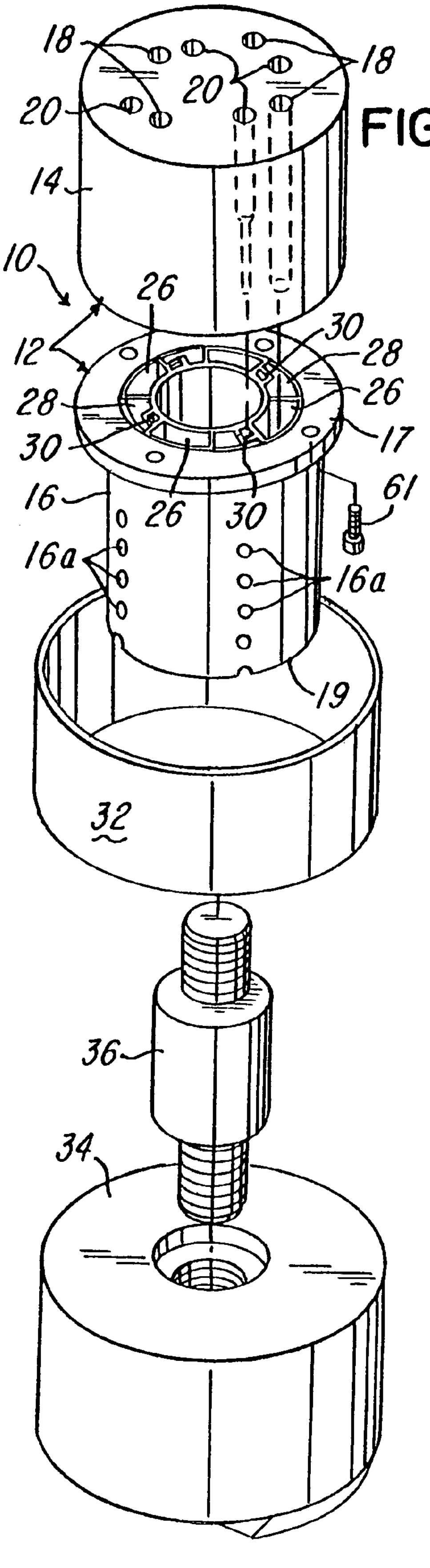
FIG. 1 is an exploded view showing a powder loader for loading a plurality of powders in accordance with one aspect of the invention.

Referring now to FIG. 1, a system and method for loading a plurality of powder materials into a compaction die or tool will now be described. The system 10 comprises a powder loader 12 having a top or head portion 14 and a body portion 16. The head portion 14 comprises a first plurality of introducing apertures 18 and a second plurality of introducing apertures 20 for introducing a plurality of powder materials 22 and 24 (FIGS. 3 and 7A-7C), respectively, into at least one of a plurality of channels, apertures or receiving areas 26, 28 and 30. In the embodiment being described, the powder 22 comprises a hard magnetic powder, such as NdFeB, SmCo, alnico, and the like, powder 24 is a grade or filler powder, such as spherical iron or steel, and the powder 25 comprises a soft magnetic powder, such as an iron or ferromagnetic powder and its alloys. In the embodiment being described, the powder 24 is non-compressible.

Figure 5:
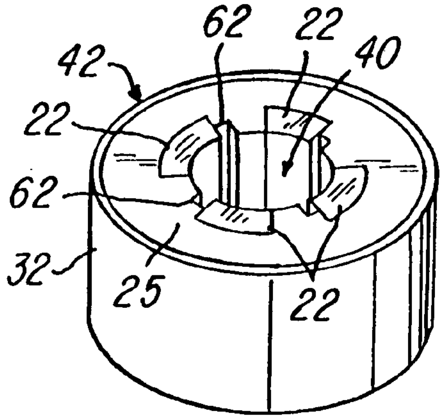
FIG. 5 illustrates a part after electromagnetic compaction and after it has been removed from a base and axial member.

In the embodiment being described, the die or tool of system 10 comprises at least one base or body member 34 (FIG. 1) that receives an armature 32 made of a conductive material, such as copper. In the illustration being shown in FIG. 1, the base 34 also receives at least one connecting member, die, platen, or member 36 for defining an aperture in a finished, compacted part, such as part 42 in FIG. 5, and also for securing base 34 to a top member 35.

Figure 7A:
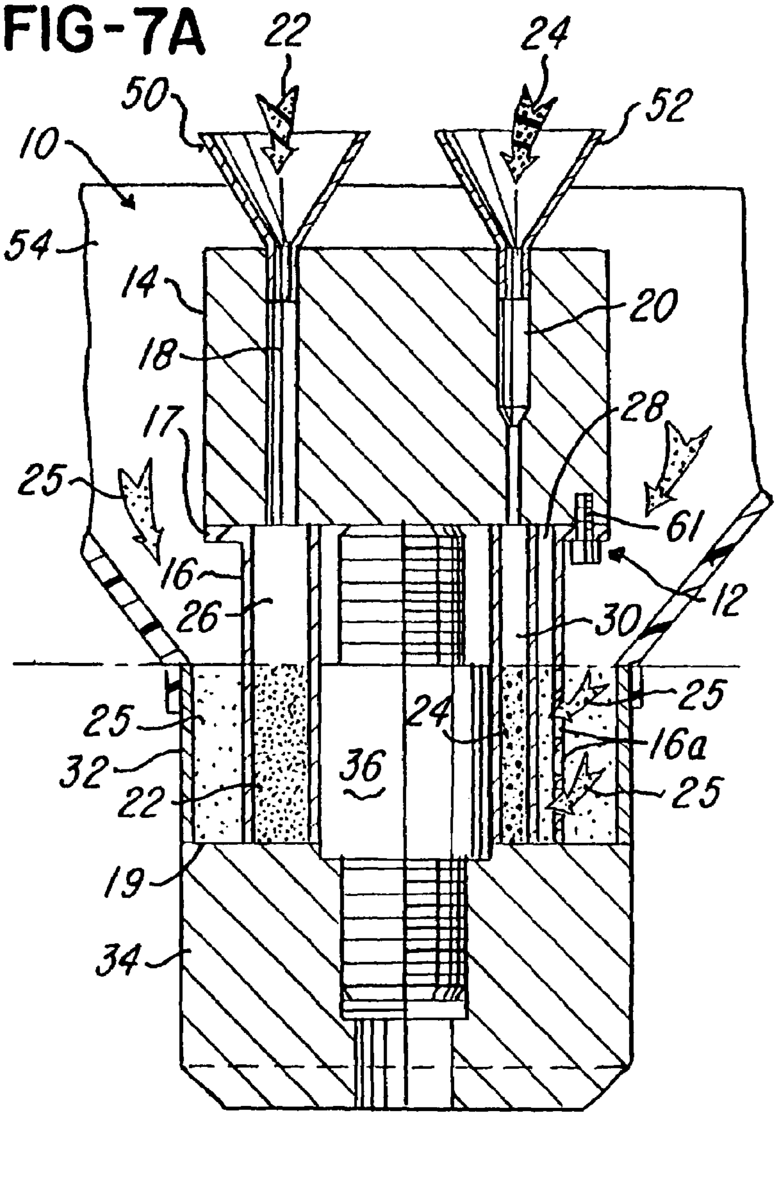
FIG. 7A is a view taken along the line 7A-7A in FIG. 6.

The at least one member 36 is threadably received in the base 34, as illustrated in FIGS. 1 and 7A. The body portion 16 and head portion 14 are received by the at least one member 36 after the armature 32 is situated on the base 34 and the powder materials 22, 24 and 25 are loaded through the powder loader 12 into the armature 32. It should be appreciated that the at least one member 36 provides a platen against which armature 32 compacts the powders 22, 24 and 25 to form part 42 during the electromagnetic compaction process. The member 36 also defines an aperture 40 (FIG. 5) in the finished part 42 (FIG. 5) after the part 42 is removed or separated from the at least one member 36 and body member 34.

It should be understood that the powder loader 12 provides the plurality of channels or apertures 18, 20, 26, 28 and 30 through which each of the plurality of powder materials 22, 24 and 25 are directed, channeled or guided into predetermined locations in the armature 32. The plurality of powder materials 22, 24 and 25 are thereafter compacted to form the aperture 40 when the armature 32, base 34 and top member 35 are electromagnetically energized. It should be appreciated that the techniques illustrated and described in U.S. Pat. Nos. 5,405,574, 5,611,139, 5,611,230, and 5,689,797 may be used to electromagnetically compact the part 42. These patents are incorporated herein by reference and made a part hereof.

Figure 3:
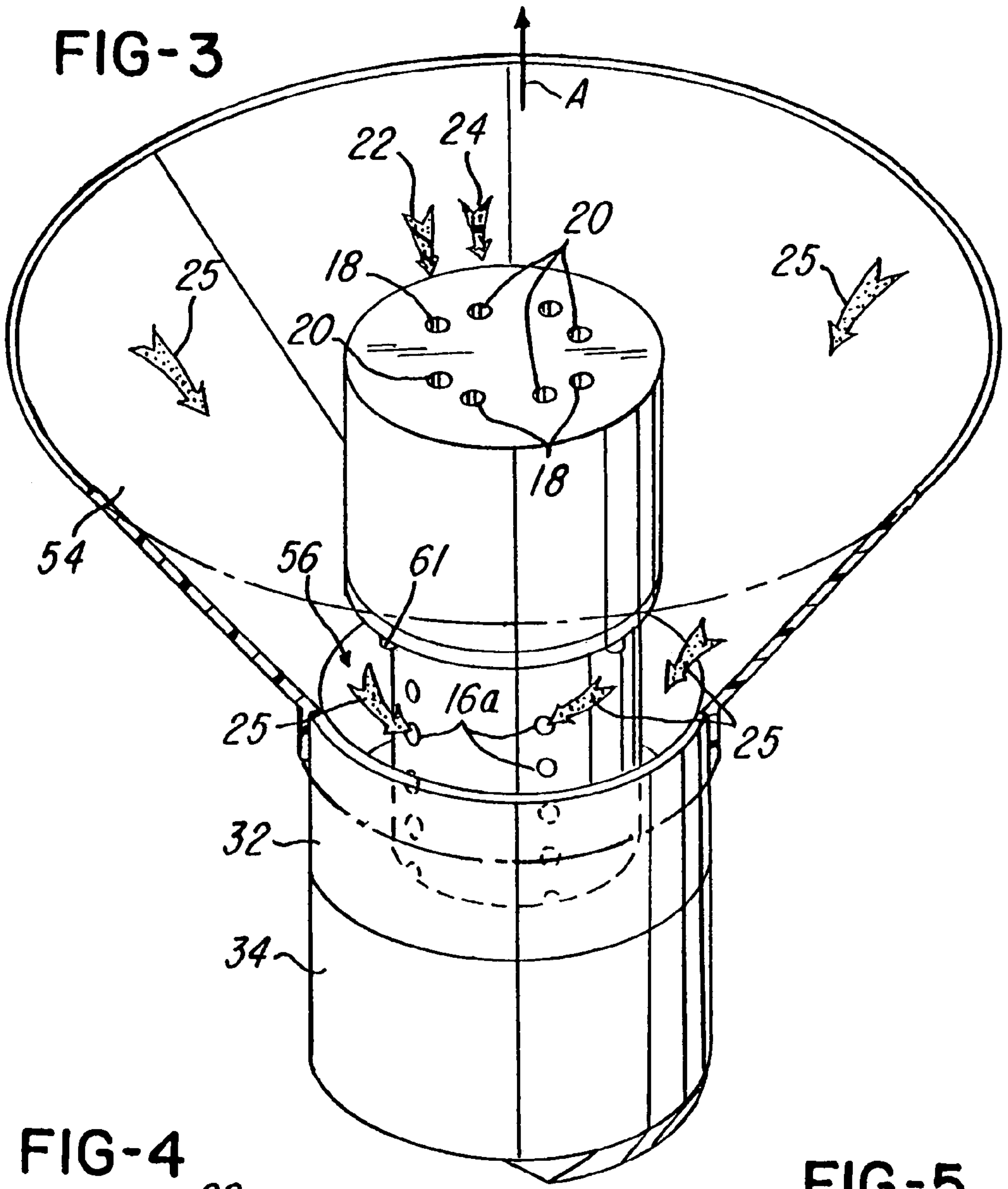
FIG. 3 is a view illustrating the use of the powder loader with a funnel.
Figure 6:
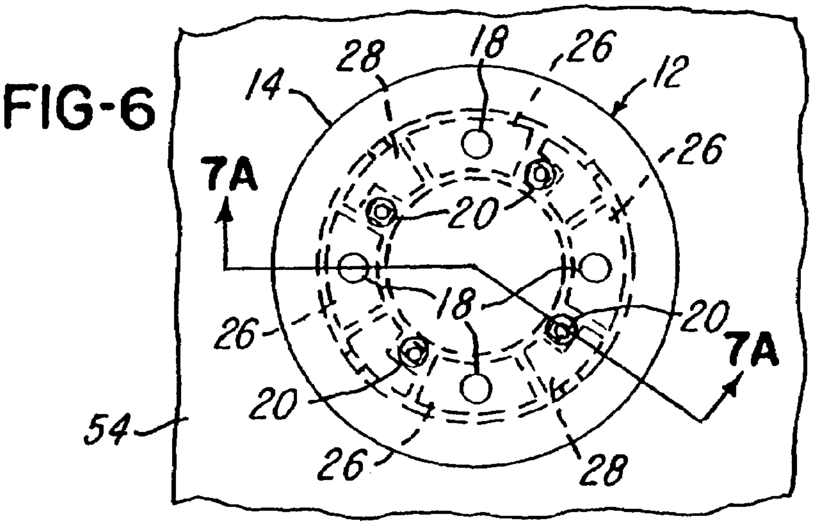
FIG. 6 is a fragmentary plan view illustrating a plurality of apertures used for loading at least one powder material into the loader.

The powder loader 12 is situated on the at least one member 36, as shown in FIGS. 1, 3 and 7A-7C, and the introducing apertures 18 communicate with the channels 26 so that when powder material 22 is loaded into the introducing apertures 18, the powder materials 22 are guided into the channels 26. Likewise, introducing apertures 20 communicate with channel 30 so that powder 24 may be introduced into introducing aperture 20 and guided into the channel 30. As illustrated in FIGS. 6 and 7A, the apertures 18 and 20 operatively align with the channels 26 and 30, respectively, so that when the powders 22 and 24 are introduced into the introducing apertures 18 and 20, the powders 22 and 24 are guided into the desired channels 26 and 30. Note that the powder 25 is fed into a plurality of side apertures 16*a* (FIGS. 1 and 7A-7C), which communicate with receiving area 28 so that the powder 25 can fill the receiving area 28. When the powder loader 12 is received within armature 32, an area 56 (FIGS. 3 and 7A) is created to receive the powder material 25, which in the embodiment being described is ferromagnetic material. As best illustrated in FIGS. 3 and 7A, it may be convenient to provide one or more funnels 50, 52 and 54 which facilitate introducing the powder materials 22, 24 and 25, respectively, into and around powder loader 12.

Figure 7B:
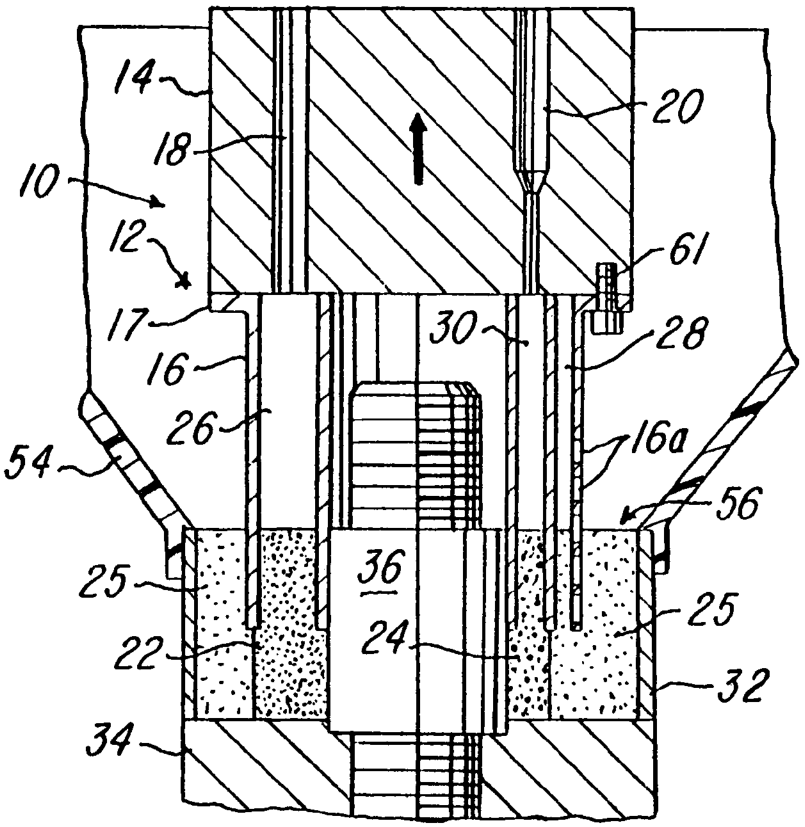
FIG. 7B is a view similar to FIG. 7A illustrating the powder loader as it is partially removed from the armature.
Figure 7C:
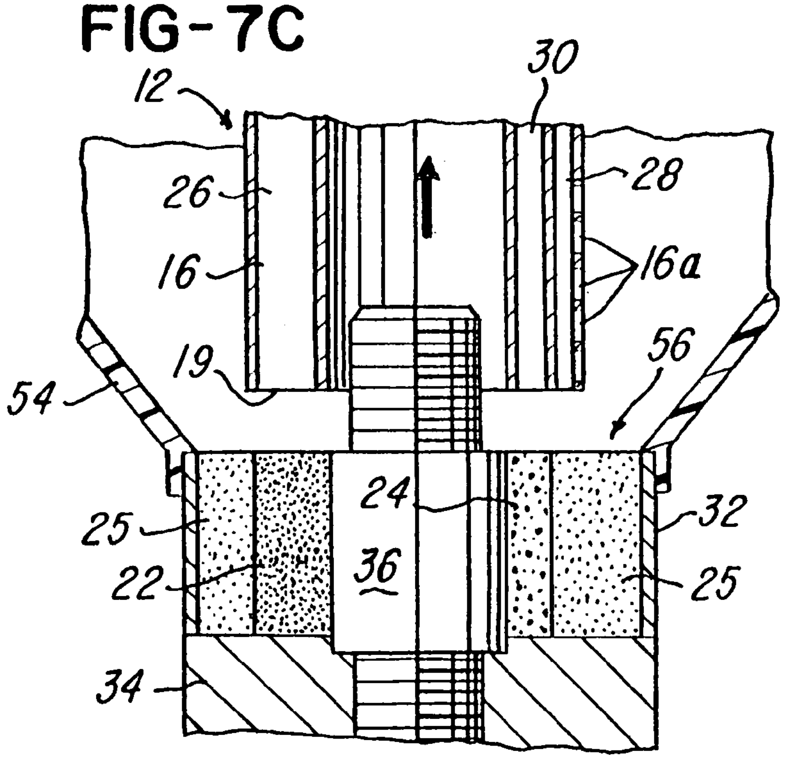
FIG. 7C is a view similar to FIGS. 7A and 7B illustrating the powder loader completely removed from the armature.

The powder loader 12 channels each of the plurality of powder materials 22, 24 and 25 into a predetermined area, such as receiving areas 26, 30 and 28, respectively, as shown in FIGS. 7A-7C.

As best illustrated in FIGS. 1 and 7A, the system 10 may comprise one or more screws 61 for fastening the body portion 16 to the head portion 14. Although not shown, it should be appreciated that the head portion 14 and body portion 16 may be one integral component.

The body portion 16 also comprises the plurality of side apertures 16*a* mentioned earlier. These apertures 16*a* introduce the powder materials 25 into channel 28. As best illustrated in FIGS. 1 and 7A, body portion 16 comprises a first end 17 and a second end 19. The head portion 14 covers the first end 17 when body portion 16 is mounted to the head portion 14. The end 19 of body portion 16 is not sealed so that the channels 26, 28 and 30 are open to deposit the powders 22, 24 and 25, respectively, into the tool and armature 32. As best illustrated in FIGS. 6 and 7A-7C, as the powder loader 12 is lifted in the direction of arrow A in FIG. 3, the plurality of powder materials 22, 24 and 25 exit the end 19 of powder loader 12 and remain in operative relationship between the armature 32 and the at least one member 36. Also, the powders 22, 24 and 25 do not become mixed so that when they are compacted to form the part 42, the part 42 comprises a plurality of densified and distinct compacted powder areas. It may be desirable to tap or vibrate one or both of the head portion 14 or body portion 16 during removal of the powder loader 12 to ensure that the powders 22, 24 and 25 exit the powder loader 12.

Figure 2:
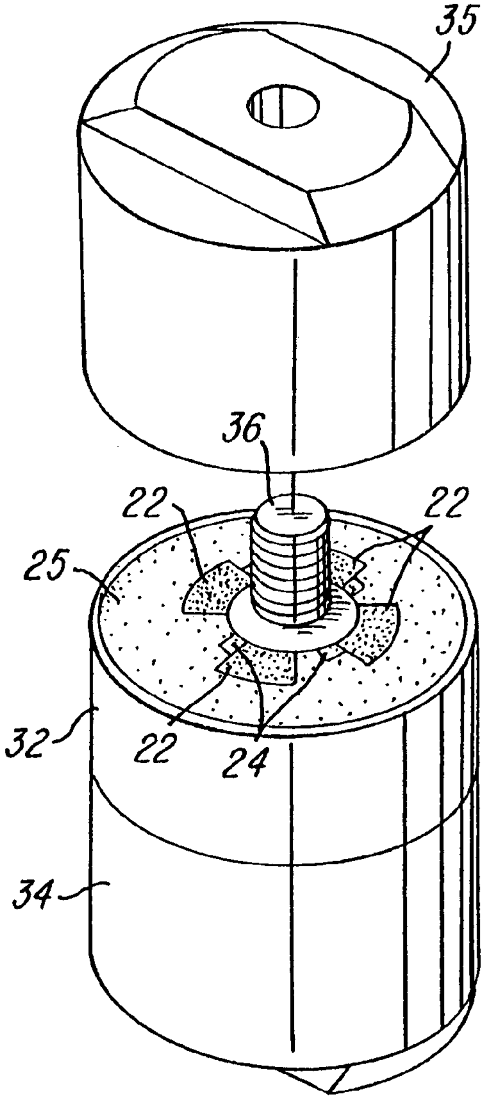
FIG. 2 is a partially exploded view illustrating a plurality of powders which were loaded into an armature using the powder loader.

After the powder materials 22, 24 and 25 are received in the armature 32, as illustrated in FIGS. 7A-7C, the powder loader 12 may be removed or separated from the base 34, leaving the powders 22, 24 and 25 distinct and separate in the predetermined arrangement in the armature 32. During this removal, it may be desired to tap or vibrate the powder loader 12 to facilitate preventing the powder materials 22, 24 and 25 from adhering to the powder loader 12 during the removal process. Thus, as illustrated in FIG. 7A, the powder loader 12 may be moved in the direction of arrow A in FIG. 7A so that the powders 22, 24 and 25 remain on the body member 34 and within the armature 32, as illustrated in FIG. 7A. Alternatively, the body member 34 may be moved away from the powder loader 12 if desired. Note that each of the plurality of powder materials 22, 24 and 25 are arranged in a predetermined configuration within the armature 32, as illustrated in FIGS. 2, and 7A-7C, after the body member 34 and powder loader 12 are separated. FIG. 2 illustrates a compaction cassette comprising the top member 35, base 34, or armature 32, any powders 22, 24, 25 situated in armature 32 and, if desired, the member 36.

Figure 4:
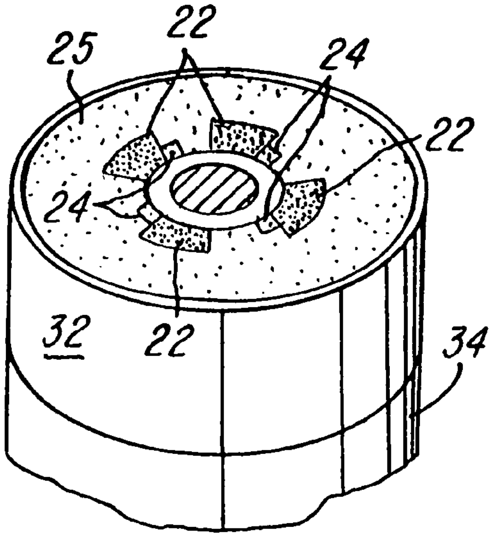
FIG. 4 is a view similar to FIG. 2 showing a plurality of powders loaded in an armature.

Thus, the powder loader 12 facilitates loading a plurality of powder materials 22, 24 and 25 in a predetermined configuration into a die, tool, base or armature 32 to provide a loaded armature 32, as illustrated in FIG. 4. Once loaded with the powders 22, 24 and 25, the top member 35 may be threadably mounted on at least one member 36. This assembly may then be placed in a conventional magnetic compaction press, such as the Magnapress® System offered by IAP Research, Inc. of Dayton, Ohio, so that the armature 32 can be energized to an appropriate level to provide the finished part (illustrated in FIG. 5).

It should be appreciated that one or more of the plurality of powder material 22, 24 or 25 may be a void powder for defining at least one void or aperture, such as apertures, channels, areas or voids 62 in the finished part 42. In the illustration described herein, the void powder 24 may be a spherical steel, spherical iron or other incompressible powders, salt or cornstarch. After the armature 32 is energized and the powders 22, 24 and 25 are compacted, the at least one member 36 by the armature 32, the powders 22, 24 and 25 are removed from the at least one member 36 and base 34 after compaction.

It should be appreciated that at least one member 36 not only provides a platen for armature 32, but also facilitates aligning the powder loader 12 in the armature 32 so that the plurality of powder materials 22, 24 and 25 may be filled into the armature 32 as desired.

The powder loader 12 or the body portion 16 may be made or comprised of a resin that melts during the magnetic compaction process and facilitates binding the plurality of powder materials 22, 24 and 25 to form the part 42. The resin powder loader 12 is not removed from armature 32 in this embodiment. Thus, this embodiment also eliminates the need of having to remove the body portion 16 from the armature 32. It should also be appreciated that the armature 32 could comprise different shapes and sizes, and while it is shown in the embodiments of FIGS. 1, 3, and 6-7C as surrounding the plurality of powder materials 22, 24 and 25. It could be arranged so that the armature 32 moves in a radial direction away from, for example, an axis of the armature 32 to force the powders 22, 24, and 25 against a die (not shown). For example, the armature 32 may drive the powders 22, 24 and 25 radially outwardly against a die (not shown), for example, having a plurality of teeth in order to form a gear. Such concepts of radial movement of the armature 32 are illustrated in the aforementioned U.S. patents which are owned by the assignee of this application and which have been incorporated herein by reference and made a part hereof.

After the powders are loaded in operative relationship with the armature 32, the assembly of the base 34, armature 32 and top member 35 are situated in a magnetic compaction machine, such as the Magnapress® System available from IAP Research, Inc. of Dayton, Ohio after the powders 22, 24 and 25 are situated in operative relationship between the armature 32 and the at least one member 36. The armature 32 and powders 22, 24 and 25 are then electromagnetically compacted. Thereafter, the compacted and densified powder materials 22 and 25 form the part 42, which in the embodiment being illustrated is a stator for use in an electric motor (not shown). As described earlier herein, the at least one member 36 defines the aperture 40 which receives a rotor (not shown) for use in an electric motor. In the embodiment being described, the armature 32 may form an integral component, such as an outer shell, of the finished part 42, but the armature 32 could be removed from the part 42 and discarded or recycled if desired.

Figure 8:
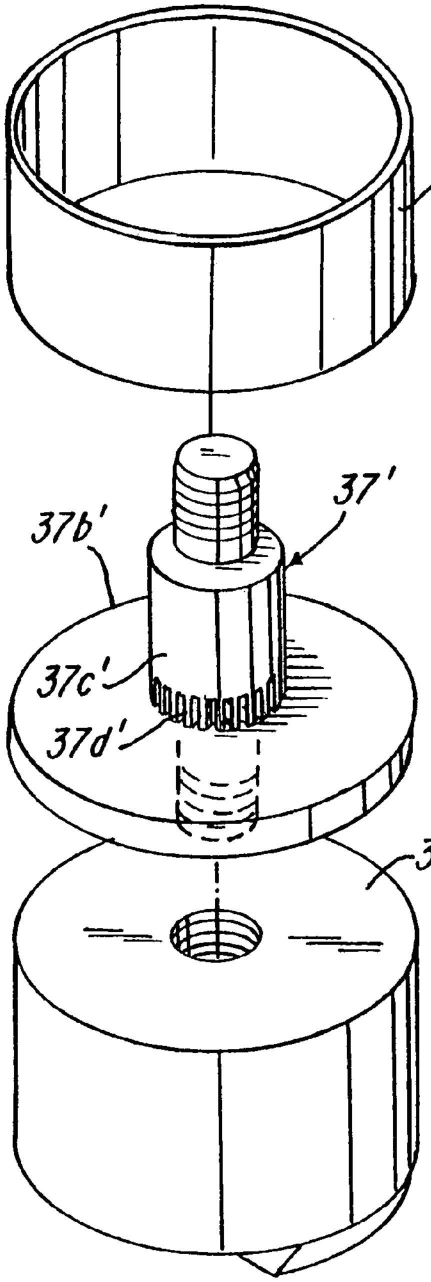
FIG. 8 is an exploded view of another embodiment of the invention.
Figure 9:
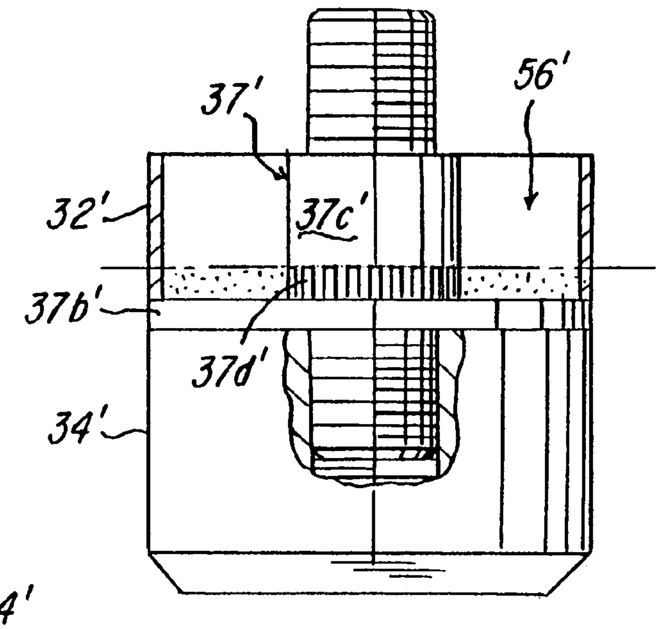
FIG. 9 is a view showing an axial member for providing a cylindrical platen comprising teeth for causing gear teeth to be manufactured in the finished part.
Figure 10:
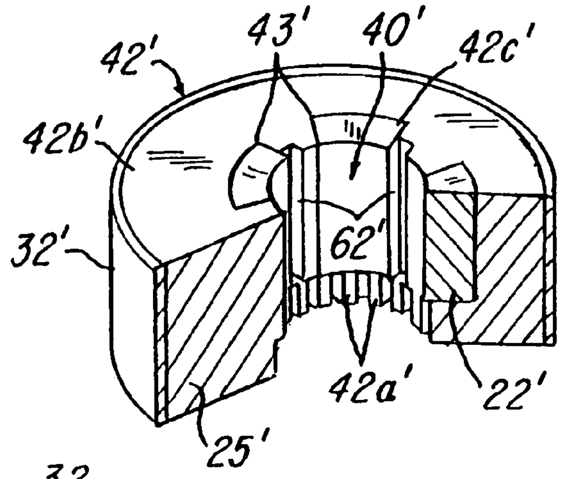
FIG. 10 is a view similar to FIG. 5 illustrating a finished part, such as a stator, having a plurality of teeth formed in the compacted powder.

It should be appreciated that the platen or at least one member 36 against which the armature 32 compacts the powders 22, 24 and 25 may be shaped to provide or define a predetermined characteristic in the part 42. FIGS. 8-10 illustrate another embodiment of the invention, with like parts being identified with the same part number, except that an apostrophe ("'") has been added to the part numbers in FIGS. 8-10. In this regard, the armature 32' is situated around the at least one member 37' and onto base 34', as illustrated in FIG. 8. The powder loader 12 (FIG. 1) may then be used to load one or more powders 22, 24 and 25 into the area 56' (FIG. 9) defined by the at least one member 37', armature 32' and base 34'. In the embodiment being described relative to FIGS. 8-10, the at least one member 37' comprises a planar member 37*b'* and a shaft 37*c'* comprising a plurality of teeth 37*d'* that will define a plurality of teeth 42*a'* (FIG. 10) in the compacted part 42'. As illustrated in the embodiment shown in FIG. 10, the finished part 42' may be a stator that has a plurality of teeth 42*a'* defined by the iron or ferromagnetic powder 25' and a plurality of magnets 43' defined by the compacted NdFeB powder 22'.

As with the powder loader 12 of the embodiment described earlier herein, the powder loader 12' guides each of the powders 22', 24' and 25' into a desired or predetermined area within the armature 32' so that after compaction, the part 42' comprises a plurality of distinct, compacted and densified materials 42*b'* and 42*c'*. Also, by using the void powder material 24' during the compaction process, the plurality of voids 62' may be defined in the part 42' after the powder 24' is removed from the part after compaction. Thus, as illustrated in FIGS. 8-10, a part 42' for use in an electric motor may be provided by electromagnetically compacting a plurality of powders, with each powder being compacted to form an integral densified material so that the parts 42 and 42' comprise a plurality of compacted metals.

Figure 12:
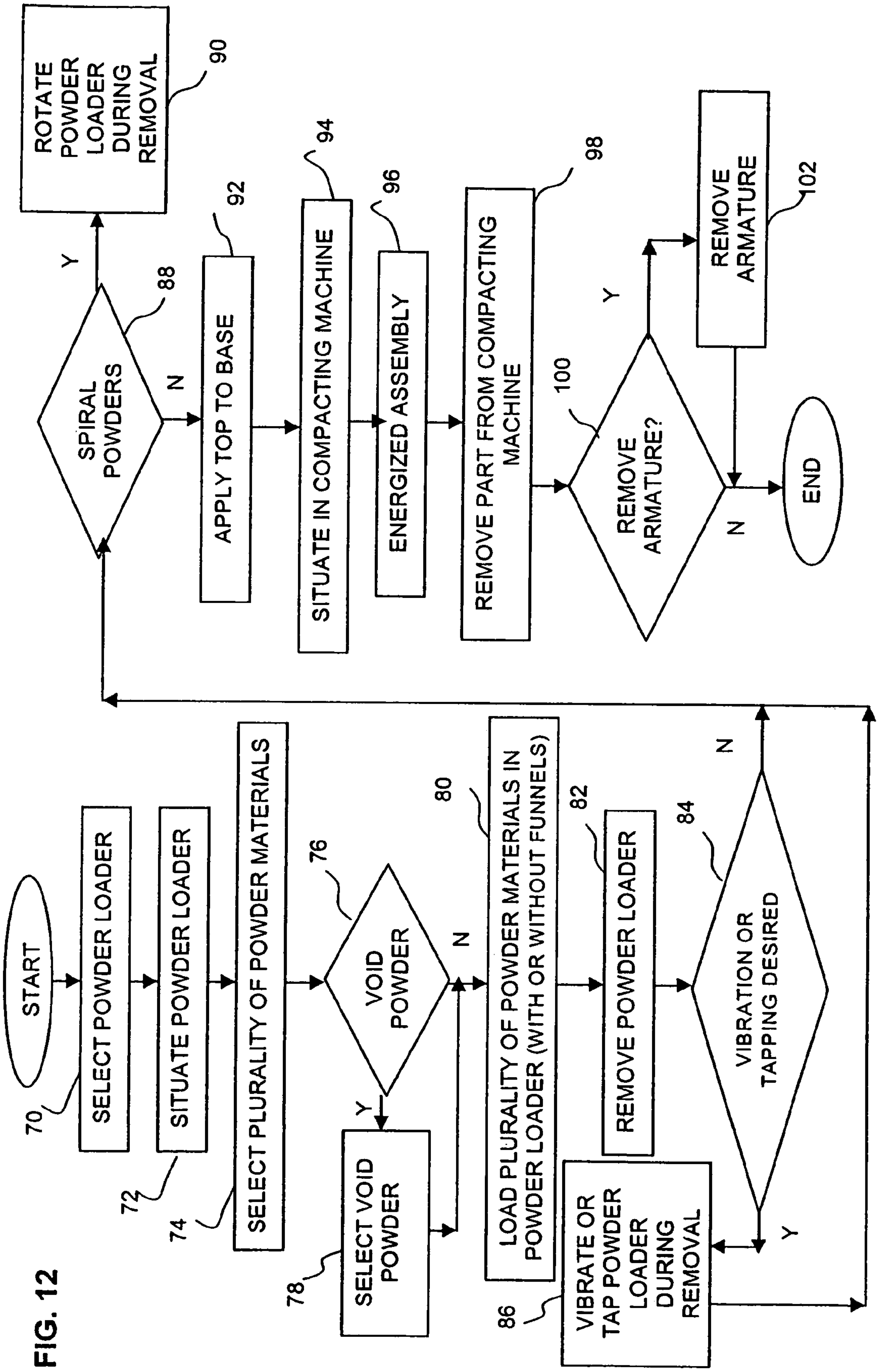
FIG. 12 is a method in accordance with an embodiment of the invention.

A method for magnetically compacting a plurality of powders to provide the part 42 will now be described relative to FIG. 12.

The method begins at block 70 and the powder loader 12 is selected. At this step, it may be desired to select a powder loader 12 made of a resin material that melts during the compaction process to facilitate densifying the powders 22 and 25. At block 72, the powder loader 12 is situated into the die or tool in operative relationship with the armature 32. At block 74, the plurality of powder materials 22, 24 and 25 are selected. At decision block 76, it is determined whether a void powder 24 is desired to be used and if it is, the void powder 25 is selected at block 78. As mentioned earlier, the void powder 24 will cause one or more voids, such as voids 62 in FIG. 5, to be created in the part 42. Thereafter or if the decision at decision block 76 is negative, the plurality of powder materials are loaded in the powder loader at block 80.

Figure 11:
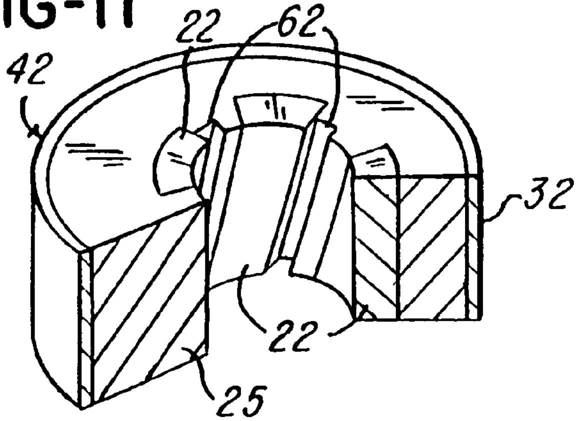
FIG. 11 is a view illustrating a part having compacted spiral components caused by rotating the powder loader and the base relative to each other to cause the plurality of powder materials to be "spiraled" prior to compaction.

The powder loader 12 is then removed from the tool or die as illustrated in FIGS. 7A-7C. At this time, it may be desired to vibrate or tap the powder loader during its removal (decision block 84) in which case the method includes the step of vibrating or tapping the powder loader 12 during removal so that all the powder 22, 24 and 25 is removed from the powder loader 12 as the powder loader 12 is removed (block 86). Thereafter or if the decision at decision block 84 is negative, the method comprises the step of deciding whether to cause the powder to be spiraled or configured into a predetermined shape, such as a spiral shape shown in FIG. 11 or into a serpentine or zig-zag shape (not shown) at decision block 88. If it is, then the powder loader 12 is moved (i.e, rotated in the illustration being described) or manipulated relative to each other from the body to cause the powders to assume a predetermined configuration by, for example, a spiral or zig-zag configuration, by rotating or moving the powder loader during its removal (block 90), as illustrated in FIG. 11.

Thereafter or if the decision at decision block 88 is negative, the top 60 is threadably secured to the at least one member 36 (block 92) and the assembly is situated in the electromagnetic compacting machine (block 94). The armature 32 is electromagnetically energized (block 96). The die or tool containing the compacted part 42 is removed from the compacting machine (block 98). As mentioned previously, the magnetic compaction system may be of the type shown and described in U.S. Pat. No. 5,611,139, which is incorporated herein by reference and made a part hereof.

In the embodiment being described, the armature 32 becomes an integral component of the part 42, but it can be removed if desired. At decision block 100, it is determined whether it is desired to remove the armature 32, and if it is, then the armature 32 is removed at block 102. Thereafter, or if the decision at decision block 100 is negative, then part 42 is finished.

Advantageously, this system and method provides means for electromagnetically compacting a plurality of powder materials to form a part 42 having a plurality of distinct and densified materials. This part 42 may be a stator for use in an electrical motor (not shown) that has a plurality of powder materials which have been identified in accordance with the system and method described herein. Note that the finished part 42 may also comprise a plurality of voids 62 or desired channels or apertures formed by the at least one member 36 or by a void powder 24 which is removed after the part 42 is compacted and densified.

The powder loader 12 has been shown and described as providing a plurality of channels 26, 28 and 30 for guiding the plurality of powder materials 22, 25 and 24, respectively, into the predetermined configuration in the die or tool and in operative relationship with the armature 32. It should also be appreciated, however, that other channels or channeling arrangements may be provided so that the plurality of powder materials 22, 24 and 25 are arranged or situated in the armature 32 in another desired or predetermined configuration. Also, the powder loader 12 or at least the base portion 16 of the powder loader 12 may be at least partially formed of a bonding material, such as resin or even another powder, that becomes an integral component of the finished part 42, so that the powder loader 12 or the body portion 16 does not have to be removed after the plurality of powder materials 22, 24 and 25 are loaded into the tool or die.

While the system and method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

The invention claimed is:

1. A compaction system comprising:

a compactor for compacting a plurality of powder materials to form a part;

said plurality of powder materials comprising different materials;

a die for receiving said plurality of powder materials;

a powder loader comprising a head portion and a body portion;

wherein said head portion having a plurality of introducing apertures;

wherein said body portion having a plurality of channels for channeling each of said plurality of powder materials into a predetermined configuration in said die;

said body portion further comprising a second plurality of apertures and in communication with at least one of said plurality of channels respectfully;

said plurality of introducing apertures becoming in communication with said plurality of channels, respectively, when said head portion is situated on the body portion;

said die being situated in said compacter so that said plurality of powder materials become compacted to produce said part comprising a plurality of powder materials to form said part having a plurality of densified powder materials:

wherein said body portion adapted to be received in said die to cause said plurality of powder materials to remain substantially separated while said plurality of powder materials are loaded into said die, said body portion being adapted to be removed from said die with said plurality of powders remaining in said die in a plurality of distinct areas, such that after said compaction, said plurality of powders form said part having a plurality of densified powder materials.

2. The system as recited in claim 1 wherein said powder loader comprises a resin that melts during compaction, said resin facilitating binding said plurality of powder materials to form said part.

3. The system as recited in claim 1 wherein said powder loader comprises a plurality of introducing apertures in communication with a plurality of channels for introducing and channeling; respectively, said plurality of powder materials into said die.

4. The system as recited in claim 3 wherein said powder loader comprises:

a head portion comprising said plurality of introducing apertures;

a body portion comprising said plurality of channels;

said plurality of introducing apertures become aligned with said plurality of channels, respectively, when said head portion is situated on said body portion.

5. The system as recited in claim 4 wherein said system further comprises:

a funnel for funneling said plurality of powder materials into said plurality of introducing apertures.

6. The system as recited in claim 1 wherein said die cooperates with an armature to compact said plurality of powders when said armature is subject to an electromagnetic field.

7. The system as recited in claim 6 wherein said compacter is a compaction press.

8. The system as recited in claim 1 wherein said part is a stator.

9. The system as recited in claim 4 wherein said powder loader further comprises:

a base having at least one member associated therewith for receiving said body portion and said head portion; and said at least one member defining an aperture in said part after said plurality of powder materials are compacted.

10. The system as recited in claim 1 wherein said plurality of powder materials comprise at least one ferromagnetic material.

11. The system as recited in claim 1 wherein said plurality of powder materials comprise only one ferromagnetic material.

12. The system as recited in claim 1 wherein said plurality of powder materials comprises a soft magnetic powder, a hard magnetic material, and a non-compacting filler material.

13. The system as recited in claim 6 wherein said part is a stator.

14. The system as recited in claim 9 wherein said at least one member is a shaft member that aligns said body portion and said head portion.

15. The system as recited in claim 10 wherein another of said plurality of powder materials comprises a non-ferromagnetic material for defining at least one void in said part.

16. The system as recited in claim 4 wherein said body portion comprises a cylindrical wall comprising said plurality of apertures.

17. The system as recited in claim 4 wherein said head portion is generally cylindrical and comprises a plurality of apertures that extend through said head portion and are generally parallel to an axis of said head portion.

18. The system as recited in claim 4 wherein said head portion is generally cylindrical and comprises a plurality of apertures that extend through said head portion and are in communication with said plurality of channels and said plurality of apertures being generally parallel to an axis of said head portion.

19. The system as recited in claim 4 wherein said head portion is integrally formed with said body portion.

20. The system as recited in claim 4 wherein said head portion is mounted on an end of said body portion, a second end of said body portion defining a plurality of openings for permitting said plurality of powder materials to exit said body portion and remain in said die when said body portion and said die are separated from each other.

21. The system as recited in claim 3, wherein at least one of said plurality of apertures are not parallel to an axis of said powder loader.

* * * * *

UNITED STATES PATENT AND TRADEMARK OFFICE

CERTIFICATE OF CORRECTION

PATENT NO. : 7,455,509 B2
APPLICATION NO. : 11/044594
DATED : November 25, 2008
INVENTOR(S) : Edward Arlen Knoth, Bhanu Chelluri and Edward John Schumaker It is certified that error appears in the above-identified patent and that said Letters Patent is hereby corrected as shown below:

In Column 5, Line 5, please delete “Magnapress®” and insert --Magnepress®-- therefor.

In Column 5, Line 10, please delete “material” and insert --materials-- therefor.

In Column 5, Line 49, please delete “Magnapress®” and insert --Magnepress®-- therefor.

Signed and Sealed this

Thirtieth Day of June, 2009

JOHN DOLL
*Acting Director of the United States Patent and Trademark Office*